(No Model.) 3 Sheets—Sheet 1.

H. W. ATWATER.
ICE CREAM FREEZER.

No. 576,084. Patented Feb. 2, 1897.

Witnesses
Robert Seeberger
Louisa Browne

Inventor
Henry W. Atwater,
By Drake & G. Atty's.

(No Model.)
3 Sheets—Sheet 2.

H. W. ATWATER.
ICE CREAM FREEZER.

No. 576,084. Patented Feb. 2, 1897.

Witnesses
Robert Sollberger
Louisa Browne

Inventor:
Henry W. Atwater
By Drake & Co. Atty's (No Model.) 3 Sheets—Sheet 3.
H. W. ATWATER.
ICE CREAM FREEZER.
No. 576,084. Patented Feb. 2, 1897.
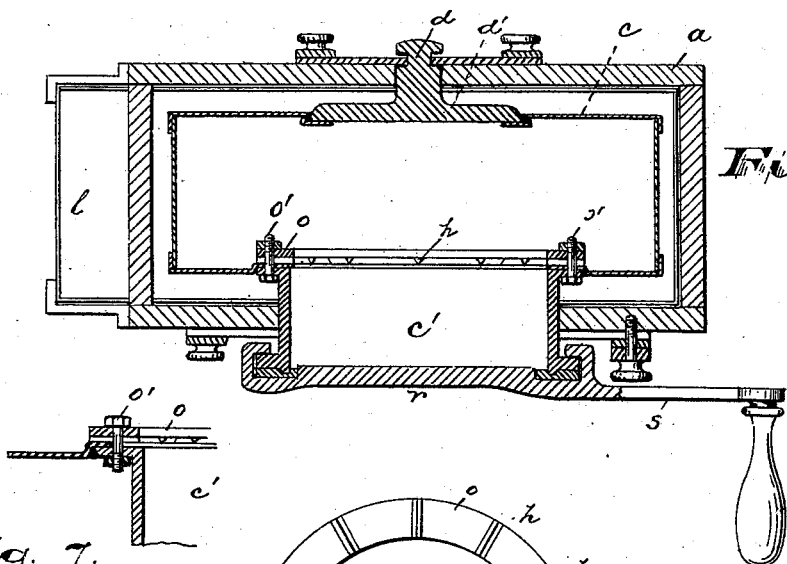
Fig. 6.
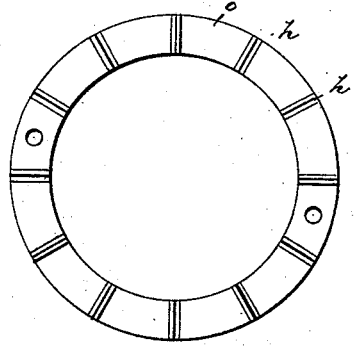
Fig. 7.
Fig. 8.
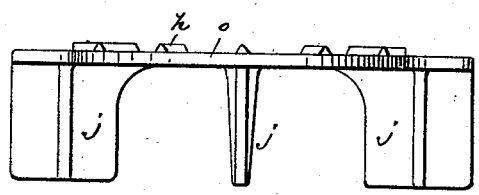
Fig. 9.
Witnesses
Robert Sollberger
Louisa Browne
Inventor
Henry W. Atwater,
By Drake & Co. Atty's.

UNITED STATES PATENT OFFICE.

HENRY W. ATWATER, OF EAST ORANGE, NEW JERSEY.

ICE-CREAM FREEZER.

SPECIFICATION forming part of Letters Patent No. 576,084, dated February 2, 1897.

Application filed February 3, 1894. Serial No. 498,944. (No model.)

*To all whom it may concern:*

Be it known that I, HENRY W. ATWATER, a citizen of the United States, residing at East Orange, in the county of Essex and State of New Jersey, have invented certain new and useful Improvements in Ice-Cream and Refrigerating Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in that class of ice-cream-freezing machines or devices illustrated in my prior patent, No. 511,319, dated December 24, 1893, the objects of the invention being to facilitate the charging of the machine with ice prior to freezing the cream; to secure a more perfect mixture of the refrigerating materials; to enable the pieces of ice to be inserted in the refrigerating-cylinder with greater ease; to reduce the cost of construction; to enable the cream after having been frozen to be removed from the sides of the cylinder and thereby saved, and to secure other advantages and results, some of which will be referred to hereinafter in connection with the description of the working parts.

Figure 1:
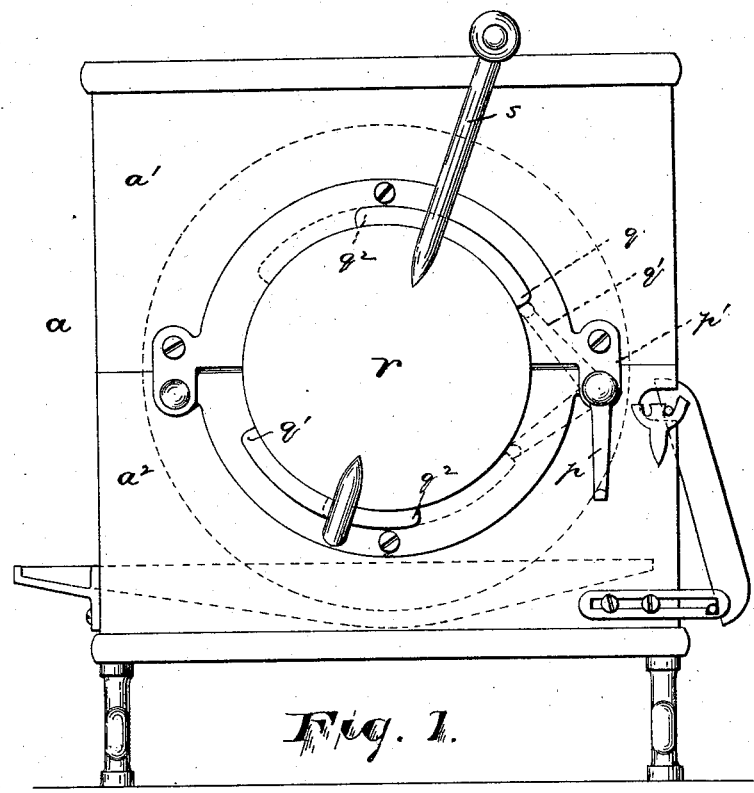
Figure 2:
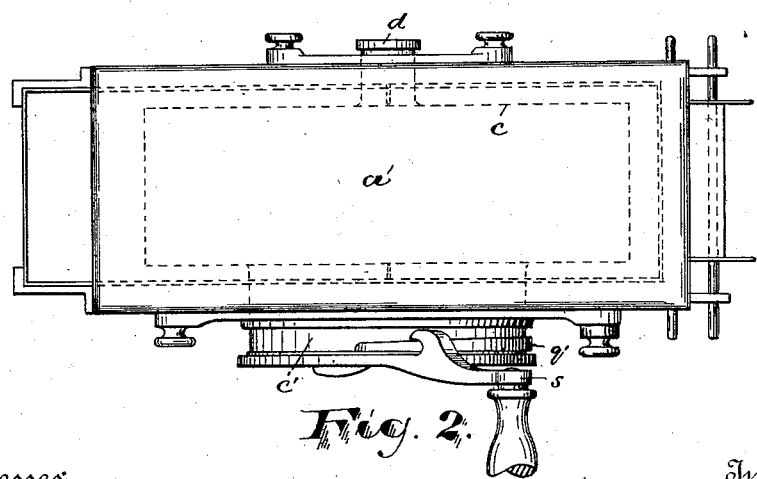
Figure 3:
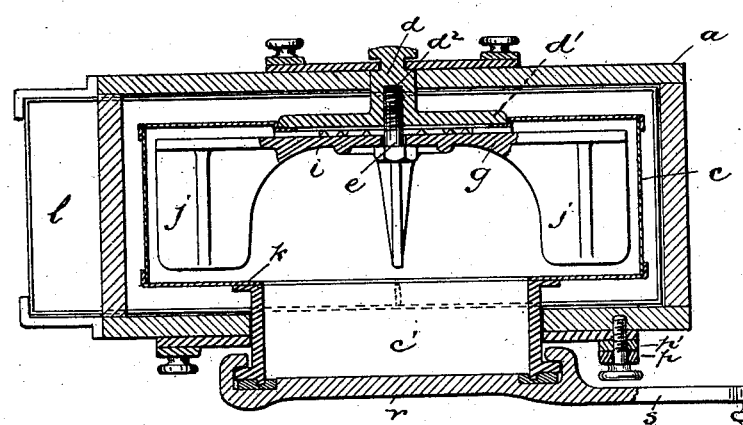
Figure 4:
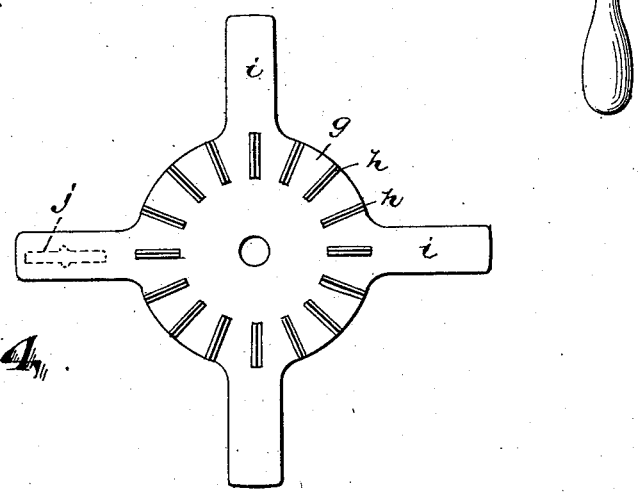
Figure 5:
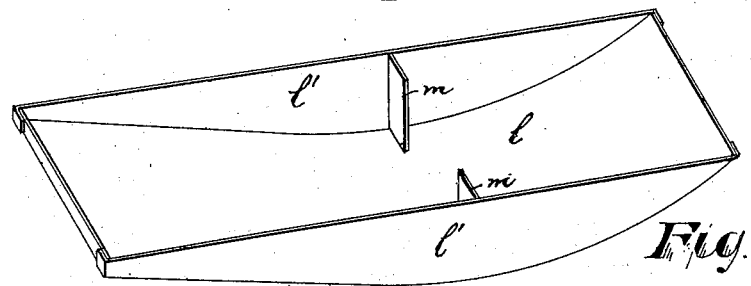

Referring to the accompanying drawings, in which like letters of reference indicate corresponding parts in each of the several views, Figure 1 is a side elevation of the improved machine. Fig. 2 is a plan of the same. Fig. 3 is a horizontal section taken through the axis of the refrigerating or freezing cylinder. Fig. 4 is an outside face view of a clamping-casting which provides arms for mixing the refrigerating materials. Fig. 5 is a perspective view of a cream-pan, showing certain improvements therein. Fig. 6 is another horizontal section showing modifications of construction. Fig. 7 is an enlarged detail section of a portion of the same. Fig. 8 is a plan of a clamping-ring employed in said modification, and Fig. 9 is an edge view of the same with mixing-arms.

In said drawings, $a$ indicates the box or case, which is of similar construction to that shown in the prior patent above referred to, the box being in separable sections $a'$ $a^2$, held together by clamps, such as were before shown and described, or in any other suitable manner. At the sides of the said box are formed journal-bearings for the freezing-cylinder $c$, said bearings being preferably the castings, which provide the means for clamping the box-sections together. The cylinder-journal $c'$, having the opening through which the ice is fed to the cylinder, is preferably of the same construction as shown in my former patent, with the exception that I have considerably enlarged the feed-opening and the cap of the crank covering the same. The journal on the opposite side, however, and its accompanying parts form an important feature of this invention.

Referring more particularly to Fig. 3, $d$ indicates the journal having a flange $d'$ bearing against the side of the cylinder, the latter being slightly recessed to receive the same and being provided with a female thread $d^2$ to receive a bolt $e$. On the interior of the cylinder opposite said flange is a clamping-plate $g$, which presses hard against the interior of the cylinder side and being held thereto by the central bolt $e$, which thus serves to hold both the journal and the clamping-casting in proper relation to the cylinder. Another advantage of the clamping plate or plates is to prevent the sheet-metal sides of the freezing-cylinder from warping when the journal flange or flanges are soldered to the cylinder sides. The casting or clamping plate $g$, where it engages the interior of the cylinder, is preferably provided with radial teeth $h$, (see Fig. 4,) which bite into the sides of the cylinder sufficient to prevent any pivotal movement on the central bolt when the parts are clamped together.

I may employ an interior clamping-plate $c$, as in Fig. 6, in connection with the journal-bearing having the feed-opening, which may or may not be provided with mixing-fingers, as indicated in Figs. 6, 7, 8, and 9. In this case I may employ a plurality of bolts $o'$ $o'$ near the peripheries of the plates.

In the preferred construction the interior clamping-plate $g$ is provided with radial arms $i$, which latter are provided with mixing-fingers $jj$, the said fingers extending at right angles from the arms $i$ and lying near the periphery of the cylinder. The casting $g$, with its mixing-fingers, is preferably clamped in place prior to securing the head $k$ of the cylinder in place.

Beneath the cylinder in the box $a$ is arranged the cream-pan $l$. (Shown in detail, Fig. 5.) The said cream-pan is provided with a concave bottom, the lowest part of which is in line with the lowest part of the periphery of the cylinder, as indicated in Fig. 1, and is otherwise substantially of the same construction and arrangement as is shown in my patent above referred to, excepting that I have now improved said pan by providing at its opposite sides $l'$ $l'$ scraping-flanges $m$ $m$, which are adapted to engage the opposite sides of the cylinder and to scrape the frozen cream therefrom into said pan. In the machines heretofore provided for manufacturing ice-cream the cream-pans have been devoid of such flanges, and as they have been of greater width than the width of the cylinder full opportunity has been afforded for the cream to congeal on the sides of said cylinder near the periphery and to form a solid cake thereon, which was hardly suitable to be removed and mixed with the bulk of the cream. It therefore became a waste product. By means of the flanges $m$ $m$ the sides are kept free from hardening cream, and the cream is saved, as will be apparent.

Referring now to Figs. 1 and 2 of the drawings, it will be observed that in connection with the cylinder I have provided a stop-pawl or keeper $p$, which is pivoted upon a pin or projection of the casting $p'$, which forms one of the bearings for the said cylinder. Said pawl or keeper is adapted to engage a stop projection $q$, formed on the periphery of the cylinder-journal and prevent the same from turning in its bearings, so that in applying the cap $r$, having the crank or handle $s$, and in turning it into holding relation to said cylinder it is not necessary as heretofore to grasp the cylinder within the box to hold the same from turning; but I may simply bring the said pawl or keeper into the position indicated at $q'$, Fig. 1, either before or after applying the cap and turn it upon the fixed journal into the desired holding relation. The stop projections may be and preferably are the extremities of the peripheral ridges of the hollow journal which furnish the inclines which receive the cap $r$, in the manner heretofore described in my prior patent, No. 511,319, before referred to. Another stop projection $q^2$ serves in releasing the cap or journal, in which case the handle $s$ is turned in the opposite direction, as will be understood.

I am aware that modifications may be made in the constructions, arrangements, and operations of the parts described without departing from the scope of the invention.

Having thus described my invention, what I claim as new is—

1. The improved ice-cream machine herein described, in which is combined a box, a rotary freezing-cylinder, arranged in said box, and a cream-pan arranged beneath said cylinder, and provided with inwardly-projecting scraping-flanges, adapted to scrape the cream from the sides of the said cylinder into said pan, substantially as and for the purposes set forth.

2. The improved ice-cream machine herein described, in which is combined with the box and cylinder, a cream-pan, $l$, having a concaved bottom and vertical sides on which are secured inwardly-projecting scraping-flanges, $m$, which serve to scrape superfluous cream from the sides of the cylinder into the said pan, substantially as set forth.

3. The combination with the box, a cylinder, having stop projections thereon, and a cap, $r$, provided with a handled crank serving to turn the cylinder, and to turn the cap to its closed position on said cylinder, said cap being adapted to close the opening into said cylinder, of the pawl, or keeper, $p$, adapted to prevent rotation of said cylinder when opening or closing the same, substantially as set forth.

4. The combination with the box, a cylinder having a hollow journal through which the ice may be inserted and having stop projections, of a pawl, $p$, secured to said box adjacent to said hollow journal and adapted to engage said projections, and a handled cap, substantially as set forth.

5. In an ice-cream machine, the combination with the box, cylinder and cream-pan, of a journal-clamping plate having a mixing finger or fingers, and a bolt, substantially as set forth.

6. In an ice-cream machine, the combination with the cylinder, of a casting secured at one side of the interior of said cylinder and having a mixing finger or fingers $j$, near the periphery of said cylinder, substantially as set forth.

In testimony that I claim the foregoing I have hereunto set my hand this 26th day of January, 1894.

HENRY W. ATWATER.

Witnesses:
CHARLES H. PELL,
LOUISA L. BROWNE.